US006847287B1

(12) United States Patent
Stottlemyre et al.

(10) Patent No.: US 6,847,287 B1
(45) Date of Patent: Jan. 25, 2005

(54) TRANSMITTER-RECEIVER CONTROL SYSTEM FOR AN ACTUATOR AND METHOD

(75) Inventors: Dan Stottlemyre, Carlsbad, CA (US); Paul Kahn, San Diego, CA (US)

(73) Assignee: Linear Corporation, Carlsbad, CA (US)

( * ) Notice: Subject to any disclaimer, the term of this patent is extended or adjusted under 35 U.S.C. 154(b) by 407 days.

(21) Appl. No.: 09/878,568

(22) Filed: Jun. 11, 2001

(51) Int. Cl.[7] .................................................. B60R 25/00

(52) U.S. Cl. .................................. 340/5.71; 340/825.72

(58) Field of Search ......................... 49/25; 340/825.19, 340/825.73, 5.71, 5.23, 5.7, 5.72, 5.24, 5.25

(56) References Cited

U.S. PATENT DOCUMENTS 4,385,296 A 5/1983 Tsubaki et al. ........ 340/825.72
4,529,980 A 7/1985 Liotine et al. ......... 340/825.52
4,581,606 A 4/1986 Mallory ...................... 340/539
4,665,397 A 5/1987 Pinnow ................ 340/825.56
4,750,118 A * 6/1988 Heitschel et al. ........... 364/400
4,855,713 A 8/1989 Brunius ...................... 340/506
RE35,364 E 10/1996 Heitschel et al. ........... 364/400

* cited by examiner

*Primary Examiner*—Michael Horabik
*Assistant Examiner*—Matsuichiro Shimizu
(74) *Attorney, Agent, or Firm*—Hogan & Hartson, LLP

(57) ABSTRACT

A control system for an actuator used to actuate a device. A receiver in the control system receives different transmitter identifiers from multiple transmitters. A central processor coupled to the receiver uses a received transmitter identifier as the address of a memory location. If the control system is set to a write mode when the transmitter identifier is received, a valid bit is set in the addressed memory location to indicate that the transmitter identifier is valid. If the control system is set to read mode when the transmitter identifier is received, the addressed memory location is examined to determine if a valid bit has been set. If the valid bit has been set, the central processor transmits a signal for actuating the device.

13 Claims, 5 Drawing Sheets

TRANSMITTER-RECEIVER CONTROL SYSTEM FOR AN ACTUATOR AND METHOD

FIELD OF THE INVENTION

This invention relates generally to remotely controlled actuators, and more particularly to actuators capable of being energized by multiple transmitters.

BACKGROUND OF THE INVENTION

Remotely controlled actuators such as, for example, garage door openers are known in the art. These actuators may be activated by one or more transmitters where each transmitter is associated with a unique transmitter code. In order for an actuator to respond to a particular transmitter, a receiver associated with the actuator must generally learn the code of the transmitting transmitter. The learning is generally accomplished by storing the transmitter code in a memory associated with the receiver.

Current technology allows a garage door opener to respond to multiple transmitters with multiple codes by storing the multiple codes in a receiver-memory that has a limited number of memory locations. When a code to be learned is received by the receiver, a memory location is identified via a location pointer. The transmitter code is then stored into the identified memory location and the location pointer is incremented to a next memory location for storing a next code to be learned. If the last memory location has been reached, the location pointer loops back to the beginning of the memory.

One disadvantage of the current technology is that once all the memory locations have been filled with codes, the learning of a new code causes the new code to overwrite a previously stored old code, causing the receiver to no longer respond to a transmitter with the old code.

It is therefore desirable to have an actuator that responds to multiple transmitters with different codes that does not suffer the risk of disabling previously used transmitters upon activation of a new transmitter.

SUMMARY OF THE INVENTION

The present invention is directed to a control system for an actuator used to actuate a device. According to one embodiment of the invention, the control system includes a plurality of signal transmitters where each transmitter is coded to transmit a different, unique transmitter identifier when operated. The control system further includes a receiver receiving a transmitter identifier transmitted by any of the transmitters, and a memory coupled to the receiver. The memory has a plurality of memory locations referenced by memory addresses where each memory address corresponds to one of the different, unique transmitter identifiers. The control system further includes a mode selector alternating between a first mode and a second mode, and a central processor coupled to the receiver, memory, and mode selector. Upon receipt of a transmitter identifier, the central processor identifies a memory location having a memory address corresponding to the received transmitter identifier. The central processor further determines whether the mode selector is in the first mode or the second mode. If the mode selector is in the first mode, the central processor stores a valid bit in the identified memory location indicating that the received transmitter identifier is valid.

In another embodiment of the invention, the second mode is a read mode. According to this embodiment, if the mode selector is in the second mode, the central processor reads the stored valid bit from the identified memory location for determining if the transmitter identifier is valid. If the transmitter identifier is valid, the central processor transmits a signal for actuating the device.

It should be appreciated, therefore, that the present control system may activate multiple transmitters having different transmitter IDs without facing the risk of disabling previously activated transmitters. Because the present control system does not store the actual transmitter codes in the memory locations, there is no overriding of previously stored transmitter codes which causes the previously activated transmitters to be disabled. Instead, the present control system uses the transmitter IDs as memory addresses, and sets valid bits in the memory addresses for activating the transmitters. Each transmitter is coded with a different transmitter identifier. Thus, each of the different transmitter identifiers map to a different memory location.

It should also be appreciated that the direct mapping of transmitter IDs to memory locations allows the system to be more efficient. Instead of invoking a search algorithm for searching each memory location for a match of a transmitter ID received during a read mode, the use of the transmitter ID as a memory address allows a direct mapping into an appropriate memory location. Thus, under the present system, only one memory location needs to be examined for determining whether the received transmitter ID is valid.

The present system and method therefore allows for faster actuator response time which becomes more significant as the number of possible transmitters capable of interacting with the actuator increases. Under the prior art, as the number of the possible transmitters goes up, so does the number of memory locations that need to be searched. The search time then starts to become a factor in the actuator response time.

DESCRIPTION OF THE DRAWINGS

These and other features, aspects and advantages of the present invention will be more fully understood when considered with respect to the following detailed description, appended claims, and accompanying drawings where:

DESCRIPTION OF SPECIFIC EMBODIMENTS

Figure 1:
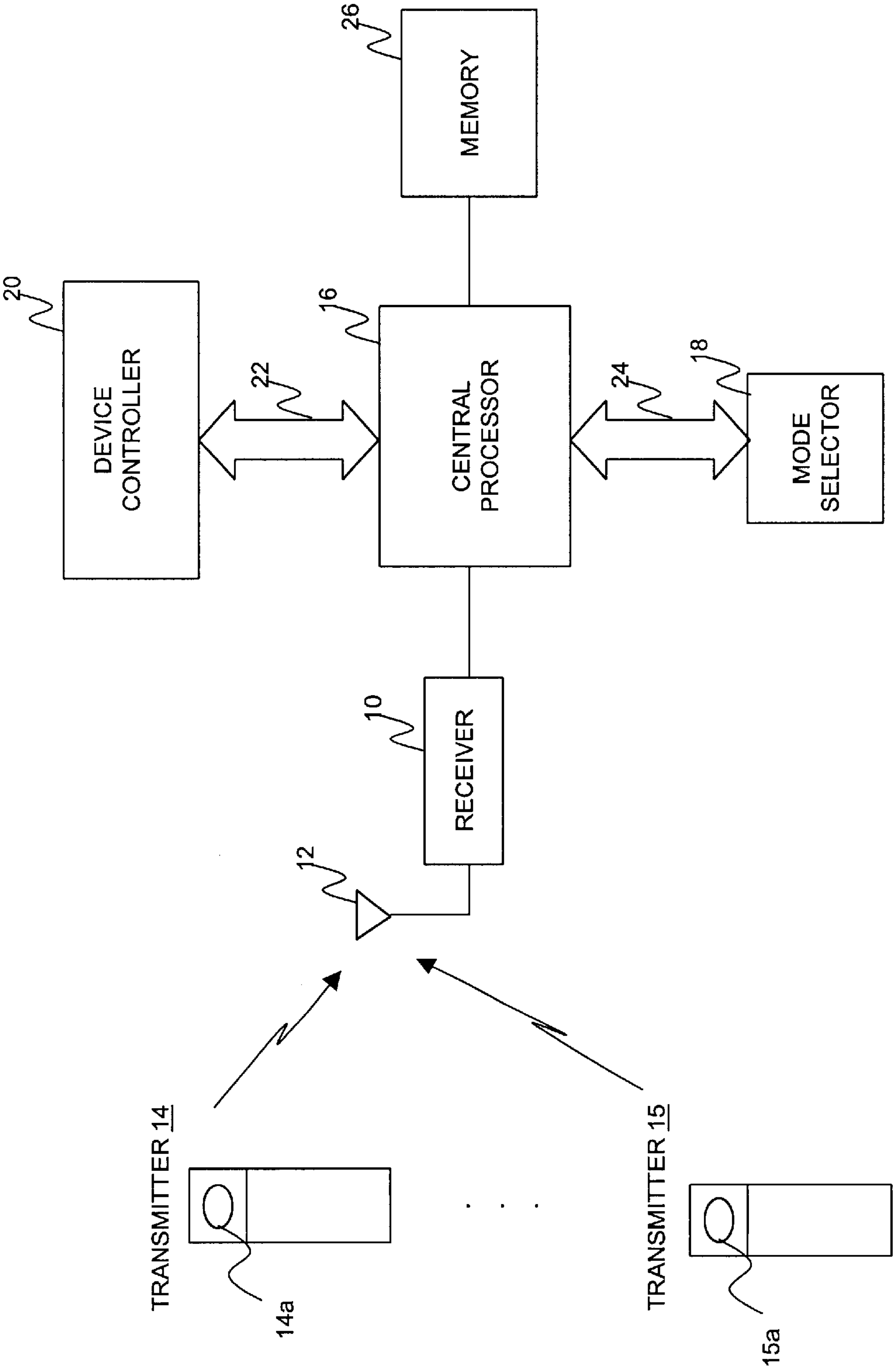
FIG. 1 is a schematic block diagram of a control system for an actuator according to one embodiment of the invention.

FIG. 1 is a schematic block diagram of a control system for an actuator according to one embodiment of the invention. The actuator may include a garage door opener, gate opener, window blinds opener, security alarm trigger, light energizer, or any other apparatus capable of triggering action on a device being controlled.

The system preferably includes a receiver 10 having an antenna 12 for receiving signals transmitted by transmitters

14, 15. The transmitters 14, 15 and the receiver 10 respectively transmit and receive RF signals. However, infrared signals and other type of signals conventional in the art may also be exchanged between the transmitters and the receiver.

Each transmitter 14, 15 preferably includes a chip encoded with a unique transmitter ID which is preferably factory-determined at the time of making of the transmitter. Each transmitter 14, 15 further includes an actuation button 14*a*, 15*a* for operating the transmitter.

The receiver 10 is coupled to a central processor 16 which may include a microprocessor and/or decoder conventional in the art. The central processor 16 is further coupled to a memory 26 having various memory locations, each memory location being identified by a memory address. According to one embodiment of the invention, there is a one-to-one correspondence between a particular memory location and a particular transmitter identifier (ID). Accordingly, the size of the memory 26 is as big as a total number of uniquely coded transmitters capable of communicating with the receiver 10. Preferably, the transmitter identifiers are used as memory addresses for accessing the corresponding memory locations.

The central processor 16 is also coupled to a mode selector 18 and a device controller 20 over communication links 22, 24. Communication links 22, 24 are preferably serial links, such as, for example, RS-232 links, but may also include other types of communication links conventional in the art.

The device controller 20 preferably includes an operation mechanism for actuating a particular device controlled by the control system. For instance, the operation mechanism may cause the opening and closing of a garage door, gate, or window blinds, the triggering of a security alarm, or turning on and off of a light fixture.

The mode selector 18 is preferably a button, switch, lever, or any other mechanical, electrical, and/or electromechanical device that may be set to one of various modes of operation. Exemplary modes of operation include a write mode, read mode, and the like. Preferably, the mode selector 18 is a manual push button that when pressed, indicates to the central processor 16 that the mode selector is in a write mode for writing a valid bit into the memory 26 to indicate that an associated transmitter ID is now valid, causing the transmitter ID to be activated. When the button is unpressed, it preferably indicates to the central processor 16 that the mode selector 18 is in a read mode for reading a stored valid bit from the memory 26 to determine whether the associated transmitter ID is valid. The mode selector 18 is preferably located on the receiver, but may also be located on a location remote from the receiver, such as, for example, a wall, fixture, or any part of the device controlled by the system.

It is understood, of course, that FIG. 1 illustrates a block diagram of the control system without obfuscating inventive aspects of the present invention with additional elements and/or components which may be required for creating the control system. These additional elements and/or components, which are not shown in FIG. 1 are well known to those skilled in the art.

Figure 2:
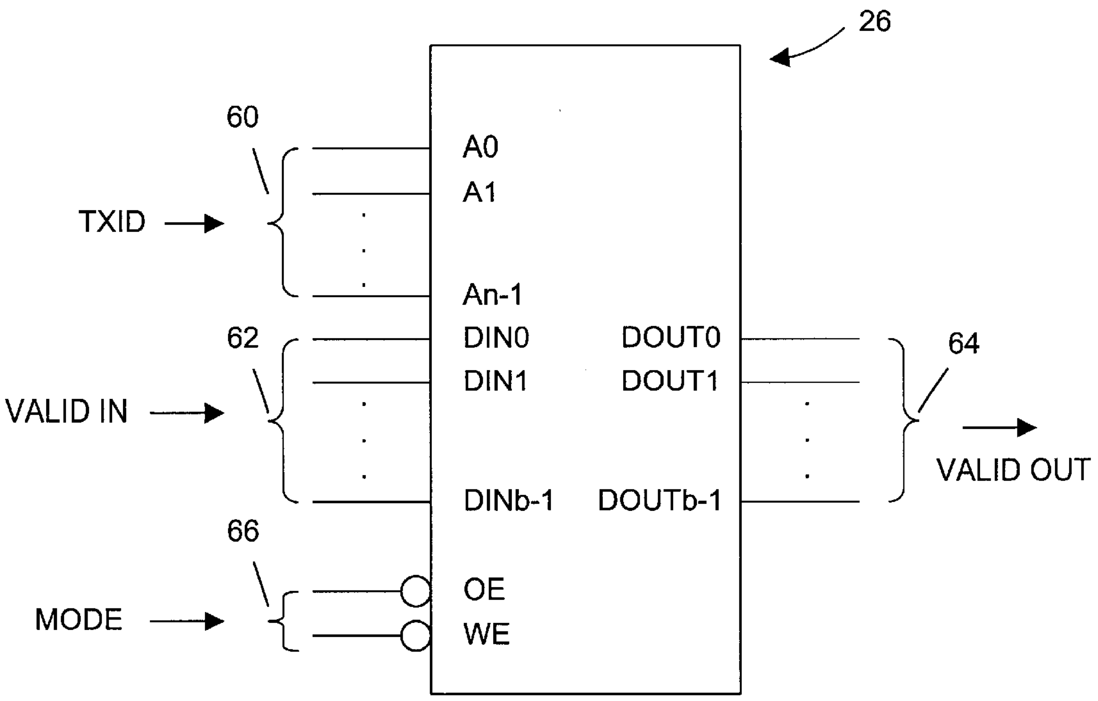
FIG. 2 is a more detailed block diagram of a memory in the control system of FIG. 1 according to one embodiment of the invention.

FIG. 2 is a more detailed block diagram of the memory 26 according to one embodiment of the invention. Preferably, the memory 26 includes address inputs 60, data inputs 62, data outputs 64, and control inputs 66. The control inputs 66 preferably include an output enable (OE) input and a write enable (WE) input. Assertion of the OE input allows the reading of a value stored in a particular memory location in the selected memory chip. Assertion of the WE input allows the storing of a value in the particular memory location. In an alternative embodiment, the control inputs 66 further include a chip select (CS) input for selecting a particular memory chip among multiple memory chips.

Preferably, a transmitter ID is provided to the address input 60 for selecting the memory location for performing a read or write operation. In addition, a valid bit is provided to the data inputs 62 for being stored in the memory location addressed by the transmitter ID if the WE input is asserted. Preferably, the WE input is asserted if the mode selector 18 is in the write mode. If the mode selector is in the read mode, the OE input is asserted and a valid bit stored in the memory location is retrieved and delivered via the data output 64. If the valid bit is set to a value of "1," it preferably indicates that the transmitter ID is valid. However, if the valid bit is set to a value of "0," it preferably indicates that the associated transmitter ID is not valid.

Figure 3:
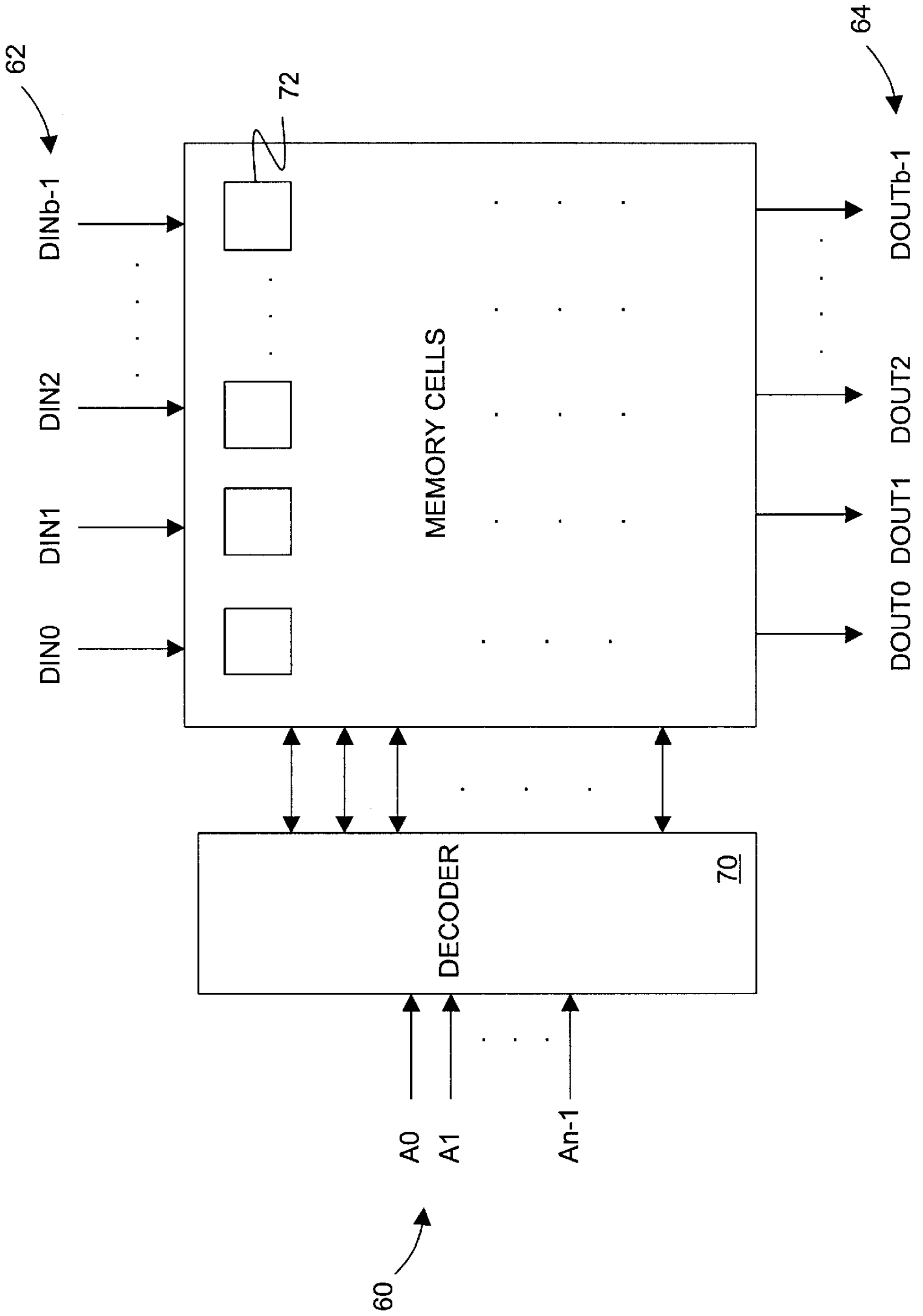
FIG. 3 is a more detailed schematic diagram of the memory in the control system of FIG. 1 according to one embodiment of the invention.

FIG. 3 is a more detailed schematic diagram of the memory 26 according to one embodiment of the invention. The memory 26 preferably includes a decoder 70 that receives the address inputs 60 and selects a particular row of memory cells 72 (also referred to as a memory locations) for reading or writing a valid bit. If the mode selector 18 is in the write mode, the WE input is asserted and the valid bit provided by the data inputs 62 is stored in the selected memory cells. If the mode selector 18 is in the read mode, the OE input is asserted and the valid bit stored in the selected memory cells are retrieved and delivered to the data outputs 64.

Figure 4:
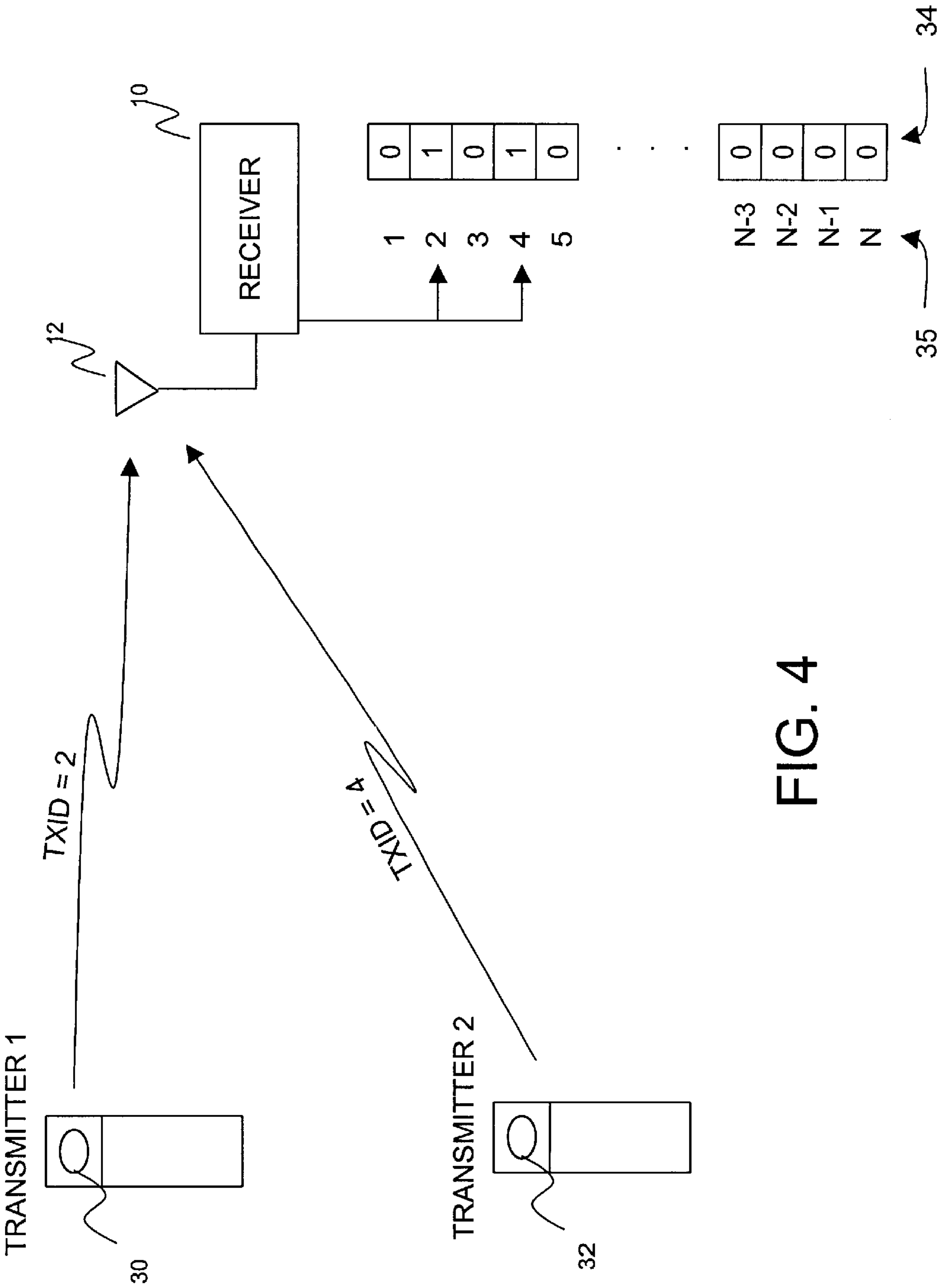
FIG. 4 is an exemplary functional block diagram of the system of FIG. 1 according to one embodiment of the invention.

FIG. 4 is an exemplary functional block diagram of the system depicting a simplified memory including memory locations 34 addressed by memory addresses 35. The valid bits in all the memory locations 34 are preferably initialized with a value of 0 for indicating that their associated transmitter identifiers are initially not valid and thus, not activated.

According to the illustrated example, transmitter 1 is programmed with a transmitter ID of "2," and transmitter 2 is programmed with a different transmitter ID of "4." If a user of transmitter 1 desires to activate the transmitter to function with the receiver 10, the user sets the mode selector 18 to the write mode and depresses an actuation button 30 on transmitter 1. This causes transmitter 1 to transmit its transmitter ID of "2" to the receiver 10. The transmitter ID is received by the receiver's antenna 12, and forwarded to the central processor 16. The central processor 16 selects a memory location with a memory address of "2" corresponding to the received transmitter ID, and sets the valid bit to a value of "1" in the addressed memory location to indicate that transmitter 1 is now valid.

Similarly, if a user of transmitter 2 wants to activate the transmitter to function with the receiver 10, the user sets the mode selector 18 to the write mode and depresses an actuation button 32 on transmitter 2. This preferably causes transmitter 2 to transmit its transmitter ID of "4" to the receiver 10. The transmitter ID is received by the receiver's antenna 12, and forwarded to the central processor 16. The central processor 16 selects a memory location with a memory address of "4" corresponding to the received transmitter ID, and sets the valid bit to a value of 1 in the addressed memory location to indicate that transmitter 2 is now also valid.

Figure 5:
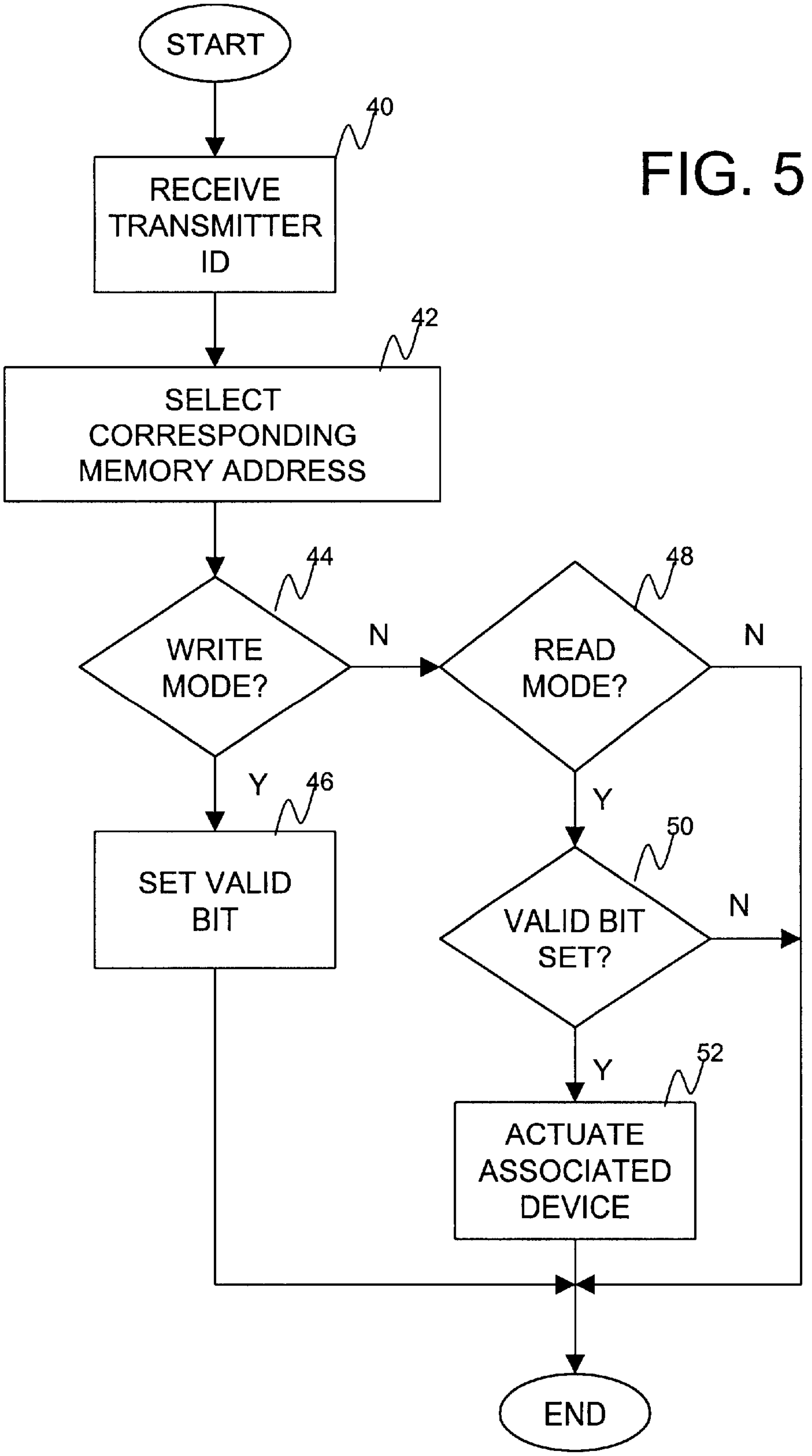
FIG. 5 is a flow diagram of a process for operating the control system of FIG. 1 according to one embodiment of the invention.

FIG. 5 is a flow diagram of the operation of the control system of FIG. 1 according to one embodiment of the invention. The process starts, and in step 40, the receiver 10 receives a transmitter ID from one of the transmitters 14 or 15, and forwards the transmitter ID to the central processor 16. The central processor 16 preferably decodes the received transmitter ID, and in step 42, selects a memory location in the memory 26 whose address corresponds to the received transmitter ID. In step 44, the central processor 16 determines whether the mode selector 18 is in the write mode. If the mode selector 18 is in the write mode, the central processor 16, in step 46, stores a valid bit set to the value of "1" in the identified memory location to indicate that the transmitter ID is now valid and thus, activated.

In step 48, the central processor 16 determines whether the mode selector 18 is in a read mode. If the mode selector is in the read mode, the central processor, in step 50, determines if the received transmitter ID has been activated by reading the valid bit stored in the identified memory location. If the read valid bit has a value of "1," the central processor 16, in step 52, actuates the associated device by transmitting a signal to the device controller 20. However, if the read valid bit has a value of "0," the transmitter ID is not valid, and the process ends.

It should be appreciated, therefore, that the present control system may activate multiple transmitters having different transmitter IDs without facing the risk of disabling previously activated transmitters. Because the present control system does not store the actual transmitter codes in the memory locations, there is no overriding of previously stored transmitter codes which causes the previously activated transmitters to be disabled. Instead, the present control system uses the transmitter IDs as memory addresses, and sets valid bits in the memory addresses for activating the transmitters. Each transmitter is coded with a different transmitter identifier. Thus, each of the different transmitter identifiers map to a different memory location.

It should also be appreciated that the direct mapping of transmitter IDs to memory locations allows the system to be more efficient. Instead of invoking a search algorithm for searching each memory location for a match of a transmitter ID received during a read mode, the use of the transmitter ID as a memory address allows a direct mapping into an appropriate memory location. Thus, under the present system, only one memory location needs to be examined for determining whether the received transmitter ID is valid.

The present system and method therefore allows for faster actuator response time which becomes more significant as the number of possible transmitters capable of interacting with the actuator increases. Under the prior art, as the number of the possible transmitters goes up, so does the number of memory locations that need to be searched. The search time then starts to become a factor in the actuator response time.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A control system for an actuator used to actuate a device, the control system comprising:

a plurality of signal transmitters, each transmitter coded to transmit a different, unique transmitter identifier when operated;

a receiver receiving a transmitter identifier transmitted by any of the transmitters;

a memory coupled to the receiver, the memory having a plurality of memory locations referenced by memory addresses, wherein each one of the different, unique transmitter identifiers is used as one of the memory addresses;

a mode selector alternating between a first mode and a second mode; and a central processor coupled to the receiver, memory, and mode selector, the central processor including logic for:

selecting a memory location having a memory address that uses the received transmitter identifier;

determining whether the mode selector is in the first mode or the second mode; and storing a valid bit in the selected memory location indicating that the received transmitter identifier is valid if the mode selector is in the first mode.

2. The control system of claim 1, wherein the first mode is a write mode for writing into the memory.

3. The control system of claim 1, wherein the second mode is a read mode for reading from the memory.

4. The control system of claim 1, wherein the central processor further includes logic for:

reading the stored valid bit from the selected memory location for determining if the transmitter identifier is valid if the mode selector is in the second mode; and transmitting a signal for actuating the device if the transmitter identifier is valid.

5. A method for controlling an actuator used to actuate a device, the method comprising the steps of:

receiving a transmitter identifier from one of a plurality of signal transmitters, each transmitter coded to transmit a different, unique transmitter identifier when operated;

selecting a memory location in memory having a memory address that uses the received transmitter identifier;

determining whether a mode selector is in a first mode or a second mode; and storing a valid bit in the selected memory location indicating that the received transmitter identifier is valid if the mode selector is in the first mode.

6. The method of claim 5, wherein the first mode is a write mode for writing into the memory.

7. The method of claim 5, wherein the second mode is a read mode for reading from the memory.

8. The method of claim 5 further comprising the steps of:

reading the stored valid bit from the selected memory location for determining if the transmitter identifier is valid if the mode selector is in the second mode; and transmitting a signal for actuating the device if the transmitter identifier is valid.

9. A controller for actuating a device comprising:

a receiver configured to receive a transmitter identifier transmitted by a transmitter;

a memory coupled to the receiver and having a memory location identified by a memory address, wherein the transmitter identifier directly maps to the memory address, and wherein data is stored in the memory location that indicates whether the transmitter identifier is valid; and control logic for reading the data stored in the memory location and transmitting a signal for actuating the device if the data indicates that the transmitter identifier is valid.

10. The controller of claim 1, wherein the data stored in the memory location comprises a bit that is set to one if the transmitter identifier is valid or zero if the transmitter identifier is not valid.

11. The controller of claim 9, wherein:

the memory comprises a plurality of memory locations identified by a plurality of memory addresses, each memory address mapping to a unique and different transmitter identifier; and the control logic, in response to receipt of a transmitter identifier by the receiver, reads the data stored in a single memory location identified by the memory address that maps to the received transmitter identifier, and transmits a signal for actuating the device if the data in the single memory location indicates that the transmitter identifier is valid.

12. A method for actuating a device comprising:

receiving a transmitter identifier from one of a plurality of signal transmitters, each transmitter coded to transmit a different, unique transmitter identifier when operated;

searching a single memory location in a memory having a plurality of memory locations, the search of the single memory location being effective to determine whether the received transmitter identifier is valid; and transmitting a signal to actuate the device if the data stored in the single memory location indicates that the received transmitter identifier is valid.

13. The method of claim 12, wherein the single memory location is identified by a memory address comprising the received transmitter identifier.

* * * * *